Feb. 22, 1949. P. A. PENJASKA 2,462,545
MODIFIED PLUG GAUGE
Filed June 25, 1946

Inventor
Paul A. Penjaska

Patented Feb. 22, 1949

2,462,545

UNITED STATES PATENT OFFICE 2,462,545

MODIFIED PLUG GAUGE

Paul A. Penjaska, Owosso, Mich.

Application June 25, 1946, Serial No. 679,200

4 Claims. (Cl. 33—178)

My invention relates to gauges and more particularly to gauges for measuring the diameter of ends of holes, counterbores and the like and the largest diameter of cavities or indentations having conically inclined circumferential surfaces.

The object of my invention is to provide a gauge adapted to be adjusted quickly and easily and to be read by means of a micrometer.

Other objects of my invention may appear in the following specification describing my invention with reference to the accompanying drawing illustrating a preferred embodiment of my invention.

It is, however, to be understood that my invention is not to be limited or restricted to the exact construction and combination of parts described in the specification and shown in the drawing, but that such changes and modifications can be made which fall within the scope of the claims appended hereto.

Figure 1:
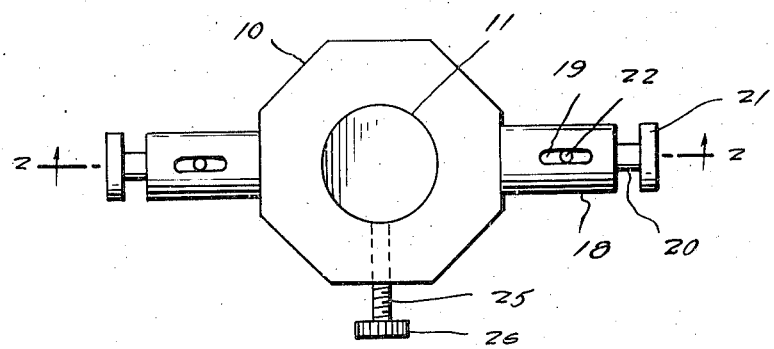
Figure 1 is a top plan view of the gauge according to my invention.
Figure 2:
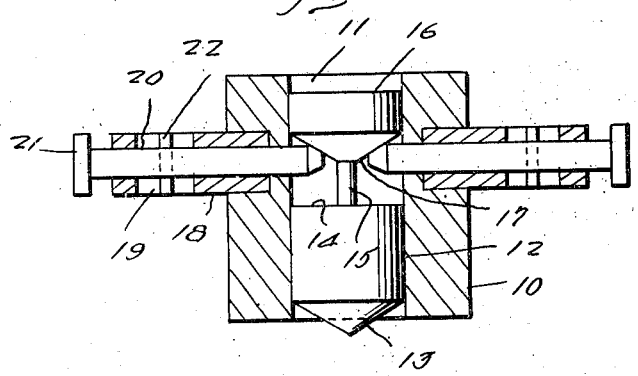
Figure 2 is a sectional view taken on line 2—2 in Figure 1.
Figure 3:
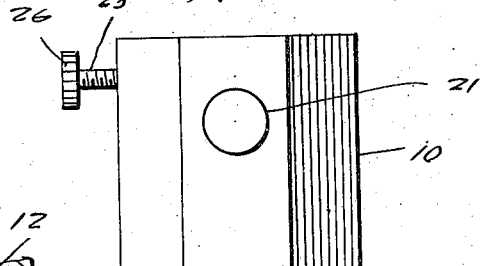
Figure 3 is an end elevational view of Figure 1.
Figure 4:
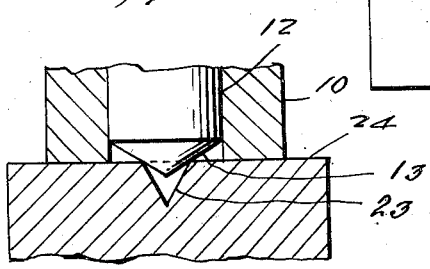
Figure 4 is a fragmentary sectional view showing a gauge according to my invention in position for measuring the largest diameter of a conical indentation in a piece of work.

Referring now in detail to the drawing the gauge according to my invention has a housing 10. This housing has preferably an octagonal circumferential outline. The upper and the lower surfaces of the housing extend at right angles to the surfaces of the circumferential wall.

A centrally located hole 11 extends from the top to the bottom surface, and from two circumferential surfaces, which are located oppositely to each other coaxial counterbored holes extend through the circumferential wall.

A cylindrical pin 12 is ground to a slip fit in the bore or hole 11 and its lower end 13 is conically shaped, the cone having base angles of approximately 15°.

The plug 12 extends approximately half way into the bore 11 and has on its upper surface 14 a centrally located, axially and upwardly extending stem 15, integrally formed therewith. On the upper end of this stem a second plug 16 is integrally formed and the lower end 17 of this plug is also conically shaped and has base angles of the same degree as the conical lower end 13 of the lower plug 12. The second plug 16 is also ground to a slip fit in the central bore 11.

In each of the counterbores of the holes extending through the circumferential wall a bushing 18 is located, which is ground to a press fit in the counterbore and is provided with a longitudinally extending slot 19 in its wall.

A gauging pin 20 is arranged slidably in each bushing 18 and extends through the corresponding hole in the housing wall into the bore 11. The inner ends of these gauging pins 20 are shaped frusto-conically. The base angles of these two ends are equal to each other and measure 75°, and the diameters of the end faces of the two gauging pins are also equal to each other.

The two gauging pins 20 are of equal length and each has a head 21 on its outer end, the thickness of the two heads being the same.

A stop pin 22 extends through each gauging pin 20 and the ends of each stop pin 22 are positioned in the slots 19 in the bushings 18 to limit the axial movement of the gauging pins in the bushings.

The holes in the side wall of the housing 10 are located so that the distance from the common axis of these holes to the bottom surface of the housing 10 is equal to the distance between the base planes of the conical ends of the plugs 12 and 16 plus ½ of the diameter of the inner end surfaces of the gauging pins.

If the uppermost diameter of an indentation 23 in a piece of work 24 is to be gauged, the housing 10 is placed on top of the piece of work, so that the axis of the indentation 23 coincides with the axis of the plug 12. This is accomplished by pushing the plugs 16 and 12 downwardly, so that the conical end 13 of the plug 12 enters the indentation. The plug is forced down until the surface of the plug end 13 contacts the entire circumference of the indentation.

The plugs 12 and 16 are secured in this adjusted position by a screw 25 threadedly extending through the side wall of the housing 10 and arranged at right angles to the gauging pins 20. The screw 24 is preferably provided with a milled or knurled head 26.

Then the two gauging pins 20 are pushed inwardly of the housing 10 until the conical surfaces of their inner ends contact the conical plug end 17.

A micrometer (not shown) is used to measure the distance from the outer surface of one of the heads 21 of the gauging pins 20 to the outer surface of the other pin head.

To find the exact size of the diameter of the indentation 23 the combined length of the two gauging pins from inner ends to pin head surface is deducted from the measurement obtained from the reading of the micrometer.

Having described my invention I claim as new and desire to secure Letters Patent:

1. In a gauge of the class described a housing, the circumferential surface whereof extends at right angles to the top and bottom surfaces, a centrally located bore extending from the top to the bottom surface, a plug slidably arranged in said bore, the lower end of said plug being shaped conically, and a screw threadedly extending through the circumferential wall of the housing and at right angles to the plug and adapted to secure the plug in any adjusted position in the bore, an upwardly extending stem on the plug, said stem being arranged coaxially with the plug, a second plug on the stem, said second plug having a conical lower end and being arranged coaxially with the first plug, the two conical plug ends having the same base angles, and a pair of diametrically opposed gauge pins, slidably arranged in the side wall of the housing at right angles to the plugs and to the screw, each of the two gauging pins having a frusto-conical inner end the base angles of these ends being equal to the complement of the base angles of the conical plug ends, and the gauging pins being adapted to contact the conical end of the second plug.

2. In a gauge of the class described a housing, the circumferential surface whereof extends at right angles to the top and bottom surfaces, a centrally located bore extending from the top to the bottom surface, a plug slidably arranged in said bore, the lower end of said plug being shaped conically, and a screw threadedly extending through the circumferential wall of the housing and at right angles to the plug and adapted to secure the plug in any adjusted position in the bore, an upwardly extending stem on the plug, said stem being arranged coaxially with the plug, a second plug on the stem, said second plug having a conical lower end and being arranged coaxially with the first plug, the two conical plug ends having the same base angles, and a pair of diametrically opposed gauge pins, slidably arranged in the side wall of the housing at right angles to the plugs and to the screw, each of the two gauging pins having a frusto-conical inner end the base angles of these ends being equal to the complement of the base angles of the conical plug ends, and the gauging pins being adapted to contact the conical end of the second plug, the overall length of the two gauging pins being equal.

3. In a gauge of the class described a housing, the circumferential surface whereof extends at right angles to the top and bottom surfaces, a centrally located bore extending from the top to the bottom surface, a plug slidably arranged in said bore, the lower end of said plug being shaped conically, and a screw threadedly extending through the circumferential wall of the housing and at right angles to the plug and adapted to secure the plug in any adjusted position in the bore, an upwardly extending stem on the plug, said stem being arranged coaxially with the plug, a second plug on the stem, said second plug having a conical lower end and being arranged coaxially with the first plug, the two conical plug ends having the same base angles, and a pair of diametrically opposed gauge pins, slidably arranged in the side wall of the housing at right angles to the plugs and to the screw, each of the two gauging pins having a frusto-concial inner end the base angles of these ends being equal to the complement of the base angles of the conical plug ends, and the gauging pins being adapted to contact the conical end of the second plug, the distance from the bottom plane of the housing to the common axis of the gauging pins being equal to the distance between the two base planes of the conical plug ends plus one half of the diameter of the inner end face of the frusto-conical end of the gauge pins.

4. A gauge of the class described, comprising a housing having a central bore extending therethrough, the axis of the bore being at right angles to one end of the housing, a plug slidably arranged within the bore and having a conical end adjacent to said end of the housing, clamping means secured to the housing and constructed and arranged to engage the plug to maintain it in any adjusted position in the bore, a second plug slidably arranged within the bore and spaced axially of the first-named plug and rigidly connected to the first-named plug for movement therewith, the second plug having a conical end, a pair of diametrically oppositely arranged gauge pins slidably mounted upon the housing at right angles to the axis of the bore and axially shiftable toward and away from each other, the gauge pins having conical inner ends to engage the conical end of the second plug within the bore, and means to limit the axial movement of the gauge pins.

PAUL A. PENJASKA.

REFERENCES CITED

The following references are of record in the file of this patent:

UNITED STATES PATENTS

| Number | Name | Date |
|---|---|---|
| 1,459,896 | John | June 26, 1923 |
| 2,177,399 | Aller | June 16, 1938 |